United States Patent
Chen

(10) Patent No.: US 9,648,648 B1
(45) Date of Patent: May 9, 2017

(54) WIRELESS DEVICE SYSTEM AND PAIRING METHOD

(71) Applicants: Inventec (Pudong) Technology Corporation, Shanghai (CN); INVENTEC CORPORATION, Taipei (TW)

(72) Inventor: Cheng-Hsin Chen, Taipei (TW)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 0 days.

(21) Appl. No.: 15/138,198

(22) Filed: Apr. 25, 2016

(30) Foreign Application Priority Data

Nov. 17, 2015 (CN) .......................... 2015 1 0788727

(51) Int. Cl.
*H04W 4/00* (2009.01)
*H04W 76/02* (2009.01)

(52) U.S. Cl.
CPC .......... *H04W 76/02* (2013.01); *H04W 4/008* (2013.01)

(58) Field of Classification Search
CPC ............................. H04W 76/02; H04W 4/008
USPC ................................................. 455/41.1–41.3
See application file for complete search history.

(56) References Cited

U.S. PATENT DOCUMENTS

| 7,653,655 B2 * | 1/2010 | Tokoro | H04L 29/06 340/539.11 |
| 2012/0214416 A1 * | 8/2012 | Kent | H04L 63/18 455/41.2 |

* cited by examiner

*Primary Examiner* — Alejandro Rivero
*Assistant Examiner* — Angelica M Perez
(74) *Attorney, Agent, or Firm* — CKC & Partners Co., Ltd.

(57) ABSTRACT

A wireless device system and method are disclosed herein, in which the wireless device system includes a wireless device and an electronic device. The wireless device includes an audio receiving unit and an encoder, in which the audio receiving unit receives a knocking wave, and the encoder encodes the knocking wave to a pairing request code. The electronic device includes an audio receiving part, a wireless transceiver and a processor. The audio receiving part receives the knocking wave, and the wireless transceiver receives the pairing request code. The processor encodes the knocking wave to a detecting code, and the electronic device connects with the wireless device when the pairing request code matched the detecting code. The wireless device touches the electronic device so that the knocking wave is generated.

9 Claims, 5 Drawing Sheets

WIRELESS DEVICE SYSTEM AND PAIRING METHOD

RELATED APPLICATIONS

This application claims priority to Chinese Application Serial Number 201510788727.5, filed Nov. 17, 2015, which is herein incorporated by reference.

BACKGROUND

Field of Invention

The present invention relates to pairing technology. More particularly, the present invention relates to wireless device systems and paring methods.

Description of Related Art

With the progress and development of technology of electronic devices (e.g., personal computer, PC) has become an important part of modern life. The way of connecting electronic peripheral device (e.g., headphones, speakers, printers, and keyboards) and the electronic devices are developed to a wireless connection for convenience.

However, the wireless device still has inconvenience in use. For example, a user takes a lot of time to pair a wireless headset paired with a host computer, thereby increasing the flow of user operation.

In the conventional art, the wireless device is paired with the personal computer by means of Near Field Communication (NFC), so as to simplify the pairing process of the wireless device. However, not all available wireless devices or personal computers have NFC units. For using NFC, the manufacturing costs are increased.

Nowadays, in order to reduce the complexity of the pairing, the pairing password of the wireless device is usually a default value (e.g., 0000). Thus, once the personal computer searches the matched wireless device, they are paired for wirelessly connection, thereby increasing an erroneous matching risk of the personal computer.

For the foregoing reasons, there is a need to have a wireless device system with an easy pairing manner, to reduce the erroneous matching risk.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides a wireless device systems and a paring method, to simplify the pairing process of the wireless device and the electronic device.

In one embodiment, a paring method of a wireless device system, includes: when a wireless device and a electronic device are touched to generate a knocking wave, encoding the knocking wave to generate a pairing request code by the wireless device, and encoding the knocking wave to generate a detecting code by the electronic device; and receiving the pairing request code by the electronic device, and determining whether the pairing request code matches the detecting code, so that when the pairing request code matches the detecting code, the electronic device wirelessly connects to the wireless device.

In one embodiment, the electronic device receives a pairing password sent by the wireless device, to confirm a paring request of the wireless device.

In one embodiment, the wireless device and the electronic device perform an encoding process according to the number of a touch, the amplitude or the frequency of the knocking wave.

In one embodiment, the electronic device determines whether an amplitude of the knocking wave is greater than a threshold value, so as to determine whether wirelessly connecting to the wireless device.

In one embodiment, the wireless device and the electronic device are touched to generate a shock wave, the electronic device determines whether the shock wave is greater than a threshold value, so as to determine whether wirelessly connecting to the wireless device.

In one embodiment, the electronic device determines whether a frequency of a lighting change in response to a touch between the wireless device and the electronic device is equal to a frequency of the knocking wave, so as to determines whether wirelessly connecting to the wireless device.

In one embodiment, a wireless device system includes a wireless device and an electronic device. The wireless device includes an audio receiving unit configured to receives a knocking wave, an encoder configured to encodes the knocking wave to a pairing request code, and a wireless transceiver unit configured to send the pairing request code. The electronic device includes an audio receiving part configured to receive the knocking wave, a wireless transceiver unit configured to receive the pairing request code, and a processor configured to encode the knocking wave to a detecting code, and to determine whether the pairing request code matches the detecting code, so that when the pairing request code matches the detecting code matches, the electronic device wirelessly connects to the wireless device, wherein the wireless device and the electronic device are touched to generate the knocking wave.

In one embodiment, the electronic device receives a pairing password sent by the wireless device, to confirm a paring request of the wireless device.

In one embodiment, the wireless device and the electronic device perform an encoding process according to the number of a touch, the amplitude or the frequency of the knocking wave.

In one embodiment, the electronic device determines whether an amplitude of the knocking wave or a shock wave is greater than a threshold value, so as to determine whether wirelessly connecting to the wireless device, wherein the wireless device and the electronic device are touched to generate the shock wave.

In view of the above, the wireless device and the electronic device are touched and encode the knocking wave respectively. The electronic device determines whether pairing with wirelessly connecting to the wireless device, to reduce the pairing period and flow of the wireless device, thereby improving convenience. Moreover, by determining the amplitude of the sound wave, the shock wave, or difference between the frequency of the lighting change and the frequency of the knocking wave, the erroneous pairing risk is reduced effectively. Therefore, the wireless device and the electronic device are physically touched to simplify pairing instructions, improve the efficiency and safety.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
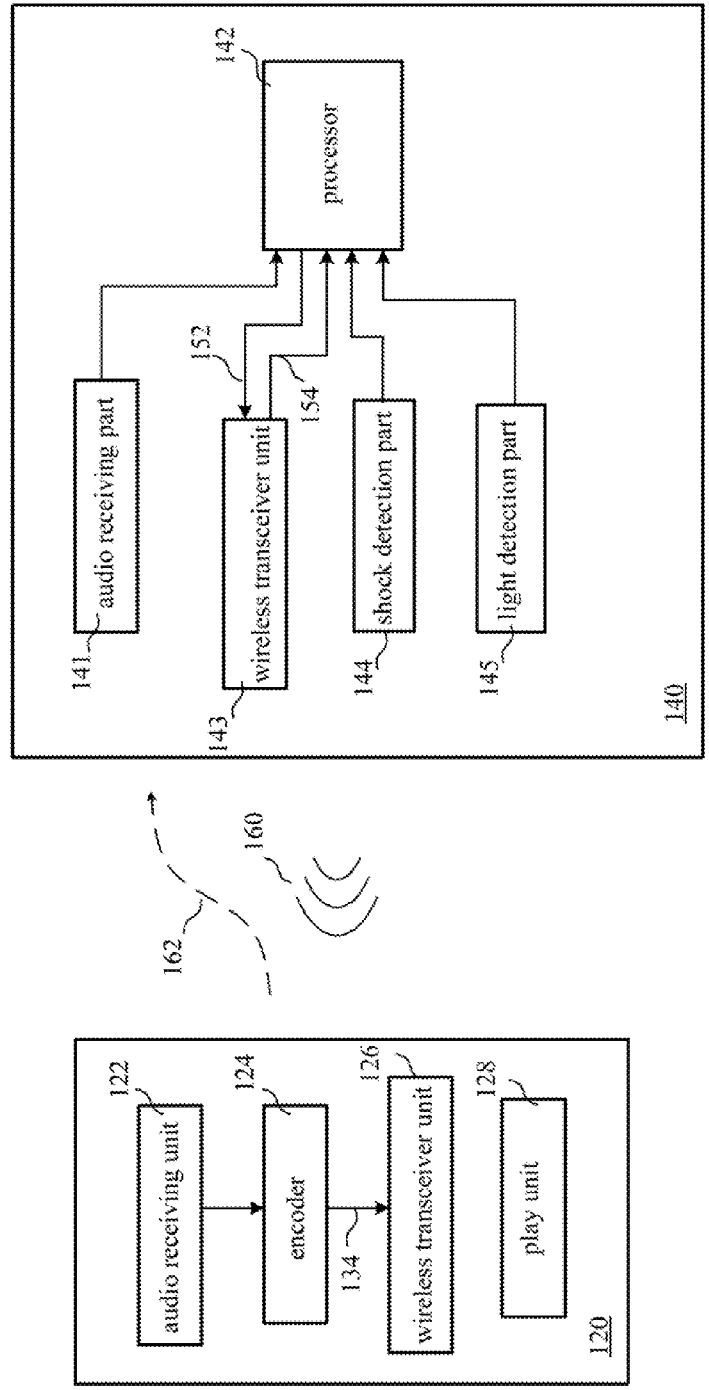
FIG. 1 is a schematic diagram of a wireless device system according to one embodiment of the present disclosure.

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present invention. Also, like reference numerals and designations in the various drawings are used to indicate like elements/parts. Moreover, well-known structures and devices are schematically shown in order to simplify the drawing and to avoid unnecessary limitation to the claimed invention.

As used in the description herein and throughout the claims that follow, the meaning of "a", "an", and "the" includes reference to the plural unless the context clearly dictates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 is a schematic diagram of a wireless device system according to one embodiment of the present disclosure. The wireless device system 100 includes a wireless headphone 120 and an electronic device 140. For illustrative purposes, in one embodiment, the wireless device is the wireless headphone 120, but the present disclosure is not limited thereto. The wireless device may be a wireless headset microphone, a wireless keyboard or any device with audio receiving function. The electronic device may be a PC, a mobile phone, a tablet computer, or the like.

The wireless headphone 120 includes an audio receiving unit 122, an encoder 124, an wireless transceiver unit 126 and an play unit 128. The electronic device 140 includes an audio receiving part 141, a wireless transceiver unit 143, a shock detection part 144, a light detection part 145 and a processor 142.

In one embodiment, a user may make a touch between the wireless headphone 120 and the electronic device 140 to be a connection request. The touch between the wireless headphone 120 and the electronic device 140 results in fluctuations in the surrounding air, so as to generate the knocking wave 160. The knocking wave 160 is received by the audio receiving unit 122 and then encoded by the encoder 124 to generate the pairing request code 134 representing the knocking wave 160. The encoder 124 performs the encoding process according to the number of a touch, the amplitude or the frequency of the knocking wave. The wireless transceiver unit 126 of the wireless headphone 120 sends the pairing signal 162 to the electronic device 140, where the pairing signal 162 includes the pairing request code 134 and the pairing password (not shown). The pairing password is used to confirm the paring request of the electronic device 140. When the electronic device 140 receives the correct pairing password and then performs a subsequent pairing determination. The audio receiving unit 122 may be a built-in microphone of the wireless headphone 120, but not limited thereto. The wireless headphone 120 may include a play unit 128. After the wireless headphone 120 and the electronic device are wirelessly connected, the play unit 128 is configured to play an audio file in the electronic device 140.

In this embodiment, when the electronic device 140 and the wireless headphone 120 are touched, the knocking wave 160 is received by the audio receiving part 141 and then encoded by the processor 142 to generate the detecting code 152 representing the knocking wave 160. The processor 142 performs the encoding process according to the number of a touch, the amplitude or the frequency of the knocking wave. The audio receiving part 141 may be a built-in microphone of the electronic device 140, but not limited thereto.

The wireless transceiver unit 143 receives the pairing signal 162 sent by the wireless headphone. The electronic device 140 confirms whether the pairing password is correct. Then, because the encoder 124 and the processor 142 have the same encoding rules, after the wireless headphone 120 and the electronic device 140 are touched, the detecting code 152 generated by the processor 142 is equal to the pairing request code 154 received by the wireless transceiver unit 143. Thus, the processor 142 determines whether the pairing request code 154 matches the detecting code 152, so as to determine whether the paring request of the wireless headphone 120 is agreed. For example, when the processor 142 determines that the pairing request code 154 matches the detecting code 152, the electronic device 140 and the wireless headphone 120 are paired and wirelessly connected. On the contrary, if the processor 142 determines that the pairing request code 154 does not match the detecting code 152, the processor 142 performs the pairing determination anew when receiving the knocking wave 160 again.

In above embodiment, the wireless headphone 120 and the electronic device 140 are paired by their physical touch, so as to reduce the erroneous matching risk in the conventional art. In the conventional art, once the pairing signal is detected, the paring request is accepted, thereby causing the erroneous matching risk.

When the wireless headphone 120 and another nearby electronic device (not shown) are touched and paired, the electronic device 140 also receives their knocking wave. Thus, the electronic device 140 may be erroneously paired with the wireless headphone 120. Therefore, in another embodiment, the processor 142 may further analyze the amplitude of the knocking wave detected by the audio receiving part 141. For example, the electronic device 140 and the wireless headphone 120 are touched to generate the amplitude of the knocking wave that is greater than the amplitude of another knocking wave generated by the touch between the wireless headphone 120 and the nearby electronic device (not shown), where the electronic device 140 also detect aforesaid another knocking wave. Therefore, the processor 142 determines whether the amplitude of the knocking wave is greater than a threshold value, so as to determines whether the knocking wave received by the audio receiving part 141 is generated by the touch between the wireless headphone 120 and the electronic device 14, or is noise generated by other devices.

For reducing the erroneous matching risk that the electronic device 140 detects the knocking wave generated by pairing another electronic device (not shown) and the wireless headphone 120, in another embodiment, the electronic device 140 includes a shock detection part 144 configured to detect rotation or vibration information of the electronic device 140. The shock detection part may be a built-in gyroscope of the electronic device 140, or the like. When another electronic device (not shown) and the wireless headphone 120 are paired to generate the knocking wave, the audio receiving part 141 also receives the knocking wave. But the wireless headphone 120 and the electronic device 140 are not touched; the shock detection part 144 does not detect the shock wave. Thus, the shock detection part 144 determines whether the shock wave is greater than a threshold value, so as to determine whether the electronic device 140 and the wireless headphone 120 should be paired. For example, when the audio receiving part 141 receives a sound wave, but the shock detection part 144 detect that the shock wave is lower than a threshold value, so that the electronic device 140 determines the received sound wave is noise. Therefore, the electronic device 140 is not paired with the wireless headphone 120.

In another embodiment, the electronic device 140 includes a light detection part 145. For example, the user makes the wireless headphone 120 touch near the light detection part 145. While the wireless headphone 120 and the electronic device 145 are touched to generate the knocking wave 160, the light detection part 145 also detects the lighting change. The light detection part 145 may be a built-in camera of the electronic device 140, but not limited thereto. Because the frequency of the lighting change is equal to the frequency of the knocking wave 160, the light detection part 145 detects the lighting change that serves as a basis of the pairing determination. For example, when the audio receiving part 141 receives an outside sound wave, and the wireless headphone 120 does not touch around the light detection part 145, the frequency of the lighting change is different from the frequency of the outside sound wave. Therefore, the electronic device 140 determines that the outside sound wave received by the audio receiving part 141 is outside noise. Therefore, the electronic device 140 is not paired with the wireless headphone 120.

Figure 2:
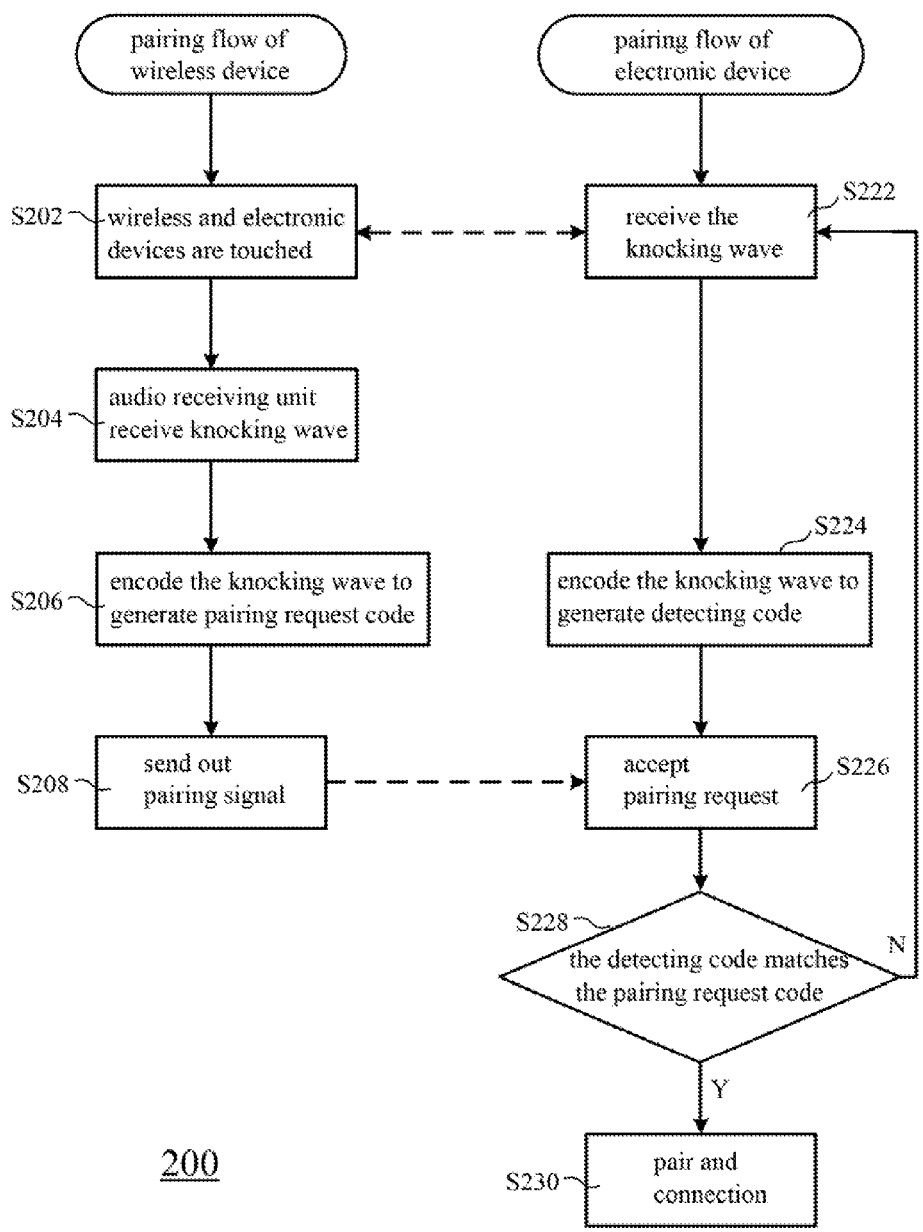
FIG. 2 is a flow chart of paring method of a wireless device system according to one embodiment of the present disclosure.

FIG. 2 is a flow chart of paring method of a wireless device system according to one embodiment of the present disclosure. The wireless device system the paring method 200 includes a plurality of operations S202-S230 that are applied in the wireless device system 100 as shown in FIG. 1. The steps are not recited in the sequence in which the steps are performed. That is, unless the sequence of the steps is expressly indicated, the sequence of the steps is interchangeable, and all or part of the steps may be simultaneously, partially simultaneously, or sequentially performed. For illustrative purposes, the paring method is implemented by the wireless device system 100 as shown in FIG. 1.

First, in operation S202, the wireless device and the electronic device are touched to generate the knocking wave. In operations S204 and S222, the audio receiving unit of the wireless device and the audio receiving part of the electronic device receive the knocking wave. In operation S206, the encoder of the wireless device encodes the knocking wave to generate the pairing request code. In operation S208, the wireless transceiver unit sends out the pairing signal, where the pairing signal includes the pairing request code and the pairing password. In operation S224, the processor of the electronic device encodes the knocking wave to generate the detecting code. In operation S226, the processor determines whether accepting the pairing request code by determining whether the pairing password is correct.

In operation S228, the processor determines whether the detecting code matches the pairing request code. The encoder and the processor have the same algorithm. Therefore, when the wireless device and the electronic device receive the same knocking wave, the processor determines that the pairing request code matches the detecting code. In operation S230, the wireless device and the electronic device are paired and wirelessly connected. On the contrary, in operation S228, if the knocking wave received by the electronic device is different from the knocking wave received by the wireless device, the processor determines the detecting code and the pairing request code are not matched, and back to operation S222 for waiting the knocking wave.

Figure 3:
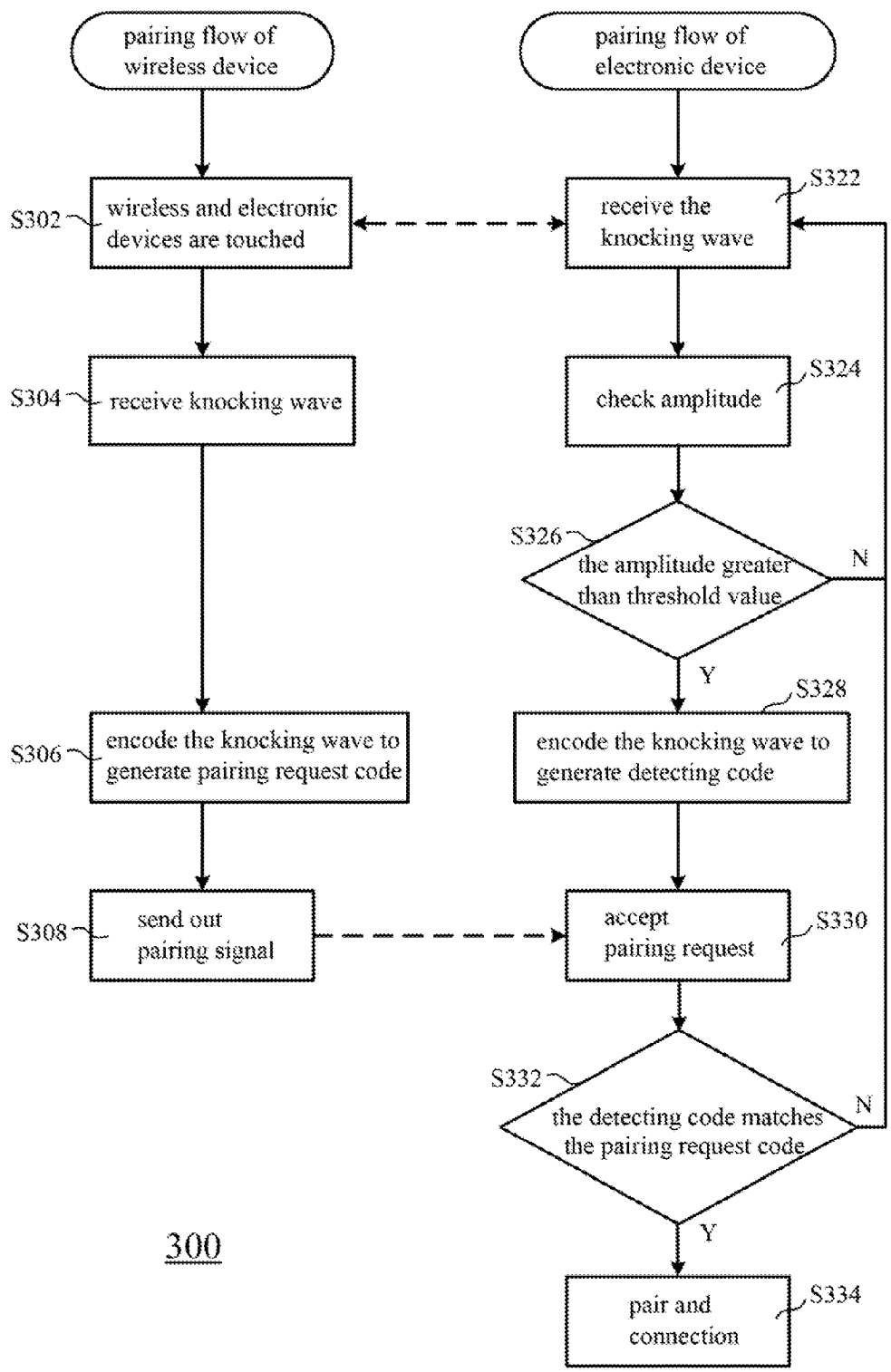
FIG. 3 is a flow chart of paring method of a wireless device system according to another embodiment of the present disclosure.

FIG. 3 is a flow chart of paring method of a wireless device system according to another embodiment of the present disclosure. The wireless device system the paring method 300 includes a plurality of operations S302-S334 that are applied in the wireless device system 100 as shown in FIG. 1. The steps are not recited in the sequence in which the steps are performed. That is, unless the sequence of the steps is expressly indicated, the sequence of the steps is interchangeable, and all or part of the steps may be simultaneously, partially simultaneously, or sequentially performed. For illustrative purposes, the paring method is implemented by the wireless device system 100 as shown in FIG. 1.

First, in operation S302, the wireless device and the electronic device are touched to generate the knocking wave. In operation S304 and S322, the audio receiving unit of the wireless device and the audio receiving part of the electronic device receive the knocking wave. In operation S306, the encoder of the wireless device encodes the knocking wave to generate the pairing request code. In operation S308, the wireless transceiver unit sends out the pairing signal, wherein the pairing signal includes the pairing request code and the pairing password.

In operation S324, the electronic device checks the amplitude of the received knocking wave. In operation S326, the electronic device determines whether the amplitude is greater than a threshold value. When the amplitude of the knocking wave is not greater than the threshold value, and it is determined that the knocking wave received by the electronic device is outside noise, and back to operations 8322 for waiting the knocking wave. On the contrary, when the amplitude of the sound wave generated by touch is greater than the threshold value, the subsequent pairing process is performed. The outside sound wave is also transmitted to the electronic device, operations S324 and S326 determines whether the amplitude of the sound wave sensed by the electronic device is greater than a threshold value, so as to filter another knocking wave generated by other electronic devices during pairing process, thereby reducing the erroneous pairing risk.

In operation S328, the processor of the electronic device encodes the knocking wave to generate the detecting code. In operation S330, the processor determines whether the pairing password is correct, so as to determines whether accepting the pairing request code. In operation S332, the processor determines whether the detecting code matches the pairing request code. When the detecting code matches the pairing request code, in operation S334, the wireless device and the electronic device are paired and wirelessly connected. On the contrary, in operation S332, the processor determines that the detecting code and the pairing request code are not matched, back to operations S322 for waiting the knocking wave.

Figure 4:
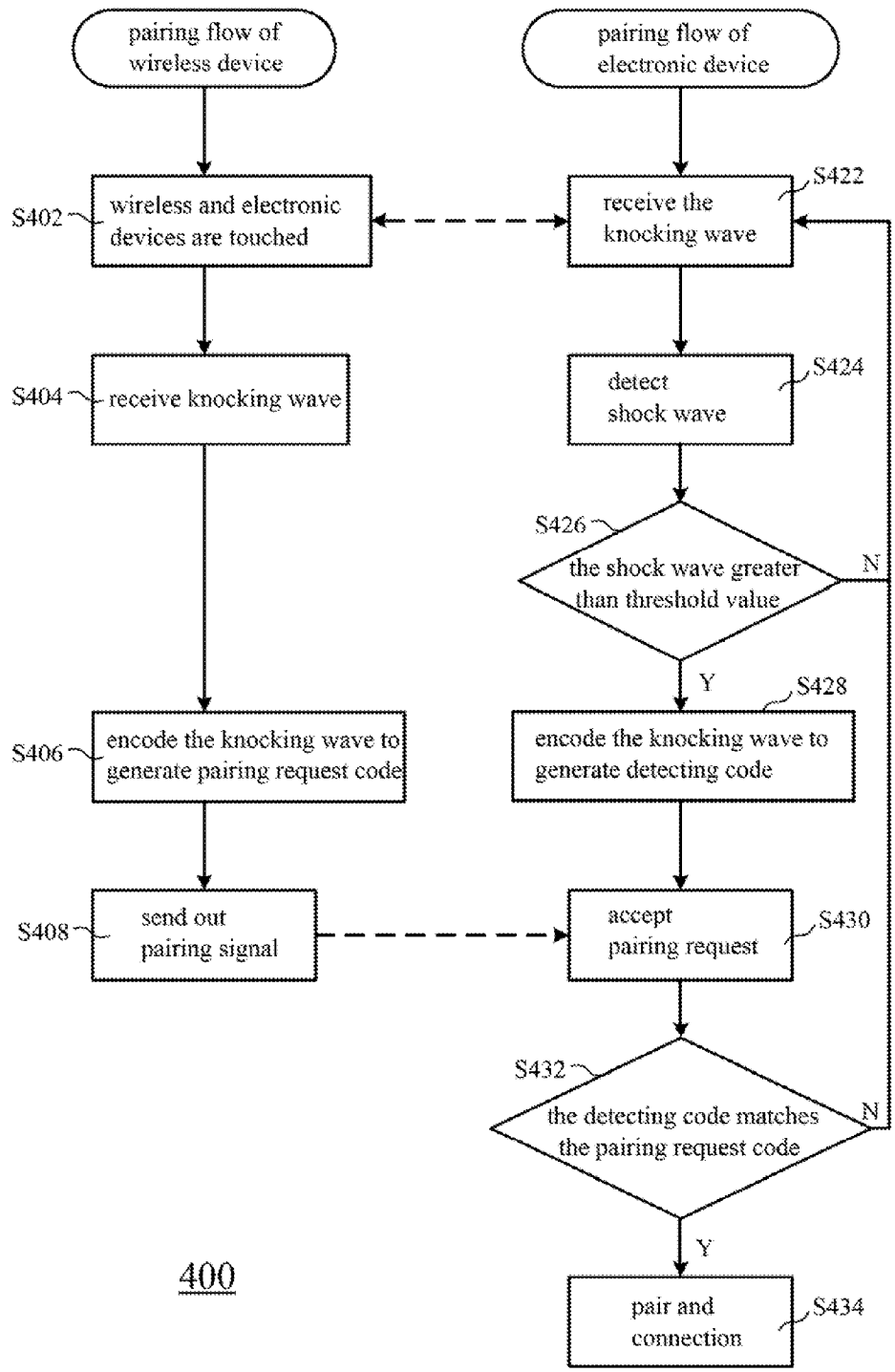
FIG. 4 is a flow chart of paring method of a wireless device system according to another embodiment of the present disclosure.

FIG. 4 is a flow chart of paring method of a wireless device system according to another embodiment of the present disclosure. The wireless device system the paring method 400 includes a plurality of operations S402-S434 that are applied in the wireless device system 400 as shown in FIG. 1. The steps are not recited in the sequence in which the steps are performed. That is, unless the sequence of the steps is expressly indicated, the sequence of the steps is interchangeable, and all or part of the steps may be simultaneously, partially simultaneously, or sequentially performed. For illustrative purposes, the paring method 400 is implemented by the wireless device system 100 as shown in FIG. 1.

First, in operation S402, the wireless device and the electronic device are touched to generate the knocking wave. In operation S404 and S422, the audio receiving unit of the wireless device and the audio receiving part of the electronic device receive the knocking wave. In operation S406, the encoder of the wireless device encodes the knocking wave to generate the pairing request code. In operation S408, the wireless transceiver unit sends out the pairing signal, wherein the pairing signal includes the pairing request code and the pairing password.

In operation S424, the shock detection part of the electronic device detects the shock wave generated by the touch between the electronic device and the wireless device. In operation S426, the electronic device determines whether the shock wave is greater than a threshold value. When the shock wave is not greater than the threshold value, it is determined that the shock wave received by the electronic device is outside noise, and back to operations S422 for waiting the knocking wave. On the contrary, when the shock wave generated by touch is greater than the threshold value, the subsequent pairing process is performed. The outside sound wave is also transmitted to the electronic device, but only the electronic device that is touched can detect the shock wave. Therefore, in operations S424 and S426, the shock detection part determines whether the shock wave sensed by the electronic device is greater than a threshold value, so as to filter another knocking wave generated by other electronic devices during pairing process, thereby reducing the erroneous pairing risk.

In operation S428, the processor of the electronic device encodes the knocking wave to generate the detecting code. In operation S430, the processor determines whether the pairing password is correct, so as to determines whether accepting the pairing request code. In operation S432, the processor determines whether the detecting code matches the pairing request code. When the detecting code matches the pairing request code, in operation S434, the wireless device and the electronic device are paired and wirelessly connected. On the contrary, in operation S432, the processor determines that the detecting code and the pairing request code are not matched, back to operations S422 for waiting the knocking wave.

Figure 5:
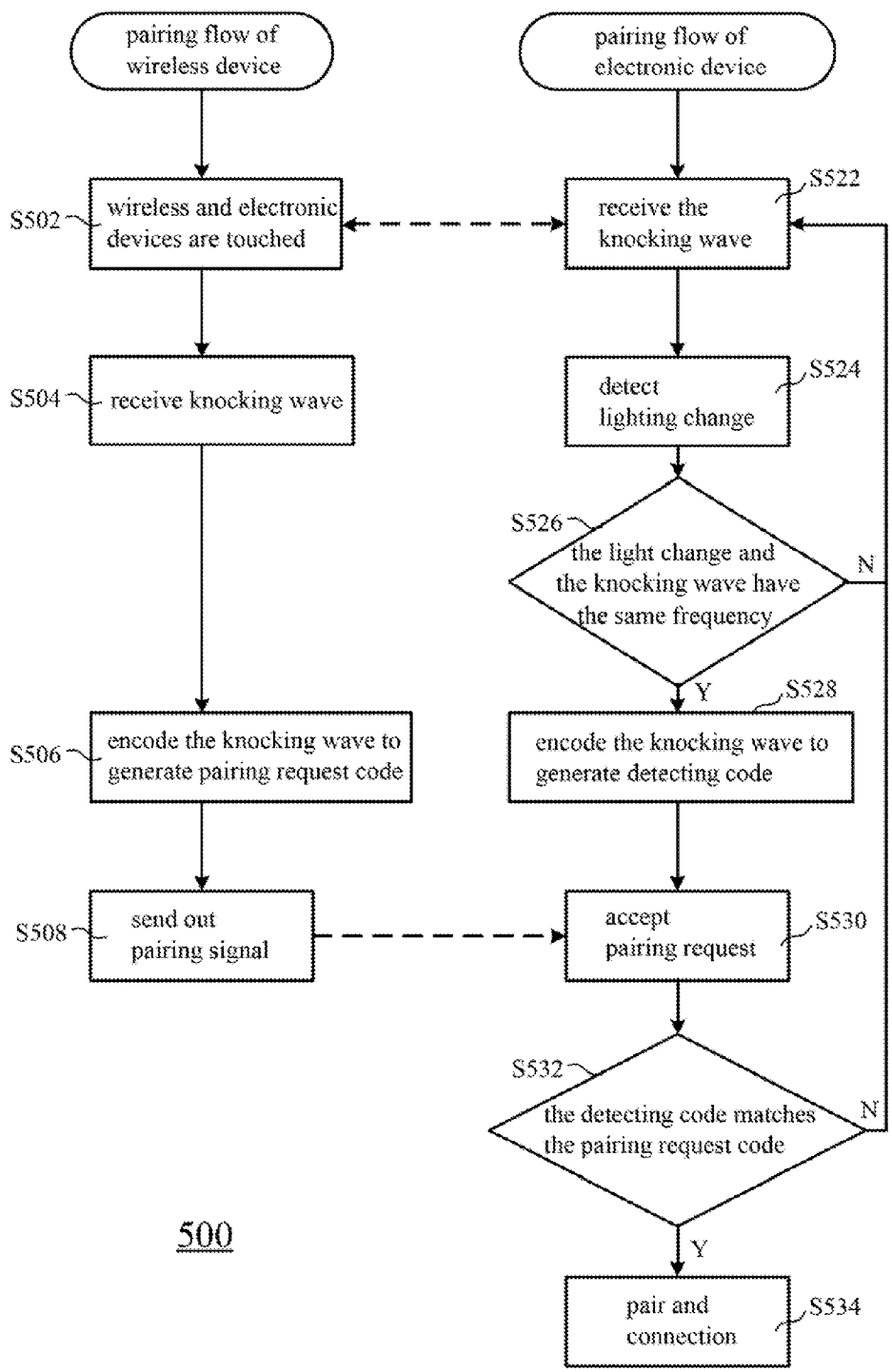
FIG. 5 is a flow chart of paring method of a wireless device system according to another embodiment of the present disclosure.

FIG. 5 is a flow chart of paring method of a wireless device system according to another embodiment of the present disclosure. The wireless device system the paring method 400 includes a plurality of operations S502-S534 that are applied in the wireless device system 500 as shown in FIG. 1. The steps are not recited in the sequence in which the steps are performed. That is, unless the sequence of the steps is expressly indicated, the sequence of the steps is interchangeable, and all or part of the steps may be simultaneously, partially simultaneously, or sequentially performed. For illustrative purposes, the paring method 500 is implemented by the wireless device system 100 as shown in FIG. 1.

First, in operation S502, the wireless device and the electronic device are touched to generate the knocking wave. In operation S504 and S522, the audio receiving unit of the wireless device and the audio receiving part of the electronic device receive the knocking wave. In operation S506, the encoder of the wireless device encodes the knocking wave to generate the pairing request code. In operation S508, the wireless transceiver unit sends out the pairing signal, wherein the pairing signal includes the pairing request code and the pairing password.

In operation S524, the light detection part of the electronic device detects the lighting change generated by the touch between the electronic device and the wireless device. In operation S526, the electronic device determines whether the frequency of the lighting change is equal to the frequency of the knocking wave. When the frequency of the lighting change is different from the frequency of the knocking wave, it is determined that the knocking wave is outside noise, and back to operations S522 for waiting the knocking wave. On the contrary, when the frequency of the lighting change is equal to the frequency of the knocking wave, the subsequent pairing process is performed. The outside sound wave is also transmitted to the electronic device, but only the electronic device that is touched can detect that the frequency of the lighting change is equal to the frequency of the knocking wave. Therefore, in operations S524 and S526, the shock detection part determines whether the frequency of the lighting change is equal to the frequency of the knocking wave, so as to filter another knocking wave generated by other electronic devices during pairing process, thereby reducing the erroneous pairing risk.

In operation S528, the processor of the electronic device encodes the knocking wave to generate the detecting code. In operation S530, the processor determines whether the pairing password is correct, so as to determines whether accepting the pairing request code. In operation S532, the processor determines whether the detecting code matches the pairing request code. When the detecting code matches the pairing request code, in operation S534, the wireless device and the electronic device are paired and wirelessly connected. On the contrary, in operation S532, the processor determines that the detecting code and the pairing request code are not matched, back to operations S522 for waiting the knocking wave.

In view of the above, the wireless device and the electronic device are touched and encode the knocking wave respectively. The electronic device determines whether pairing with wirelessly connecting to the wireless device, to reduce the pairing period and flow of the wireless device, thereby improving convenience. Moreover, by determining the amplitude of the sound wave, the shock wave, or difference between the frequency of the lighting change and the frequency of the knocking wave, the erroneous pairing risk is reduced effectively. Therefore, the wireless device and the electronic device are physically touched to simplify pairing instructions, improve the efficiency and safety.

Although various embodiments of the invention have been described above with a certain degree of particularity, or with reference to one or more individual embodiments, they are not limiting to the scope of the present disclosure.

Those with ordinary skill in the art could make numerous alterations to the disclosed embodiments without departing from the spirit or scope of this invention. Accordingly, the protection scope of the present disclosure shall be defined by the accompany claims.

What is claimed is:

1. A paring method of a wireless device system, comprising:

when a wireless device and an electronic device are touched to generate a knocking wave, encoding the knocking wave to generate a pairing request code by the wireless device, wherein the electronic device determines whether a frequency of a lighting change in response to at least one touch between the wireless device and the electronic device is equal to a frequency of the knocking wave, so as to determine whether wirelessly connecting to the wireless device;

when the frequency of the lighting change is equal to the frequency of the knocking wave, encoding the knocking wave to generate a detecting code by the electronic device; and receiving the pairing request code by the electronic device, and determining whether the pairing request code matches the detecting code, so that when the pairing request code matches the detecting code, the electronic device wirelessly connects to the wireless device.

2. The paring method of claim 1, wherein the electronic device receives a pairing password sent by the wireless device, to confirm a paring request of the wireless device.

3. The paring method of claim 1, wherein the wireless device and the electronic device perform an encoding process according to the number of the at least one touch between the wireless device and the electronic device, an amplitude of the knocking wave or the frequency of the knocking wave.

4. The paring method of claim 1, wherein the electronic device determines whether an amplitude of the knocking wave is greater than a threshold value, so as to determine whether wirelessly connecting to the wireless device.

5. The paring method of claim 1, wherein the wireless device and the electronic device are touched to generate a shock wave, the electronic device determines whether the shock wave is greater than a threshold value, so as to determine whether wirelessly connecting to the wireless device.

6. A wireless device system, comprising:

a wireless device, comprising:

an audio receiving unit configured to receive a knocking wave;

an encoder configured to encode the knocking wave to a pairing request code; and a wireless transceiver unit configured to send the pairing request code;

an electronic device, comprising:

an audio receiving part configured to receive the knocking wave;

a light detection part configured to detect a lighting change in response to at least one touch between the wireless device and the electronic device, wherein the electronic device determines whether a frequency of a lighting change in response to the at least one touch between the wireless device and the electronic device is equal to a frequency of the knocking wave, so as to determine whether wirelessly connecting to the wireless device;

a wireless transceiver unit configured to receive the pairing request code; and a processor configured to encode the knocking wave to a detecting code when the frequency of the lightning change is equal to the frequency of the knocking wave, and to determine whether the pairing request code matches the detecting code, so that when the pairing request code matches the detecting code, the electronic device wirelessly connects to the wireless device, wherein the wireless device and the electronic device are touched to generate the knocking wave.

7. The wireless device system of claim 6, wherein the electronic device receives a pairing password sent by the wireless device, to confirm a paring request of the wireless device.

8. The wireless device system of claim 6, wherein the wireless device and the electronic device perform an encoding process according to the number of the at least one touch between the wireless device and the electronic device, an amplitude of the knocking wave or the frequency of the knocking wave.

9. The wireless device system of claim 6, wherein the electronic device determines whether an amplitude of the knocking wave or a shock wave is greater than a threshold value, so as to determine whether wirelessly connecting to the wireless device, wherein the wireless device and the electronic device are touched to generate the shock wave.

* * * * *